July 3, 1951 L. W. PARKER 2,559,316

SWEEP CIRCUIT FOR TELEVISION RECEIVERS

Filed March 22, 1948 2 Sheets-Sheet 1

INVENTOR.
Louis W. Parker
BY Julius E. Foster
ATTORNEY

July 3, 1951 L. W. PARKER 2,559,316

SWEEP CIRCUIT FOR TELEVISION RECEIVERS

Filed March 22, 1948 2 Sheets-Sheet 2

INVENTOR.
Louis W. Parker
BY
Julius S. Foster
ATTORNEY

Patented July 3, 1951

2,559,316

UNITED STATES PATENT OFFICE 2,559,316

SWEEP CIRCUIT FOR TELEVISION RECEIVERS

Louis W. Parker, Little Neck, N. Y.

Application March 22, 1948, Serial No. 16,276

18 Claims. (Cl. 315—27)

This invention relates to television receivers, and particularly to receivers that employ electro-magnetic deflection systems for the picture-reproducing tube.

A principal object of this invention is to provide a television receiver of the magnetic deflection type in which a conventional transformer power-pack is not necessary.

In a conventional television receiver using electro-magnetic deflection, the horizontal deflection circuit usually requires as much D. C. power for its operation as all the rest of the equipment together. The conventional circuit also requires a D. C. voltage of between 300 and 400 volts for the plate supply for the power tube that is used to energize the horizontal deflection circuit. That requirement makes it necessary to use the conventional large and expensive transformer power pack in such receivers.

One reason for the need of such a high voltage and the transformer to provide it is that in present conventional horizontal sweep circuits the power tube that is used to energize the horizontal deflection coil is operated in class A. Such operation of the power tube is employed in order to maintain linearity between the input saw-tooth control voltage to the power tube and the output saw-tooth current to the deflection coil. For such operation in class A, the high plate voltage of between 300 and 400 volts is necessary. That high plate voltage and current has, in turn, necessitated the provision of a more expensive beam power tube than the 6L6 tube.

Thus the larger power tube and the transformer power-pack are needed because the class A operation is essentially an inefficient type of operation, and such inefficient operation with its attendant larger tube and transformer have been tolerated because they provided the linear saw-tooth current that is required for satisfactory operation of a television tube.

The purpose of this invention is to provide horizontal deflection equipment, of high efficiency and of substantial linearity, that is capable of operating on less than 250 volts, so that a voltage-doubler energized from the usual house-lighting circuit of about 110 volts will be able to supply the plate power requirements of the deflection equipment, without a transformer.

In the practice of this invention, use is made of an electron discharge tube of large current capacity, such as a beam power tube of the 6L6 type, for example. That tube is operated in class $AB_2$, and is controlled to supply the current for the electro-magnetic deflection. References in this specification and the claims to class $AB_2$ operation of a tube shall mean that the plate current in the tube flows for appreciably more than one-half cycle of the wave from an outside source applied to the control grid, but less than the complete cycle, and said grid draws current during a part of the cycle in which the grid is driven positive.

During a small part of a cycle the tube operates with considerable grid current. The voltage on the grid is then positive, and the internal impedance of the tube is therefore very low during that time when it is required to deliver high power. Consequently, the power losses inside the tube are low and the operating efficiency is high.

With such operation in class $AB_2$, the dynamic transfer characteristic of the beam power tube is not linear. But the output current from that tube must be controlled to be linear, however, for proper energization of the deflection coil of the picture-reproducing tube. The present invention provides such control.

The usual control voltage that is generated at a receiver, upon reception of a timing or synchronizing pulse, is of pulse-and-saw-tooth shape or pattern to establish a linear saw-tooth output current from the power tube to energize the picture-reproducing tube coil for horizontal deflection. The saw-tooth portion of that control voltage pattern is substantially linear, or as close thereto as circuit constants will permit. With such a linear saw-tooth control voltage applied to the power tube, according to conventional practice, that tube must operate as a linear device, in class A, and consequently, a high plate voltage is required.

In the present invention, in order that the advantages of the more efficient operation of the power tube may be realized from its operation in class $AB_2$, and yet a linear output current may also be obtained, the shape or pattern of the original saw-tooth portion of the control voltage is suitably modified to provide a voltage of modified saw-tooth pattern that will be conjugately non-linear relative to the dynamic transfer characteristic of the power tube. The resultant control effect of the non-linear transfer characteristic and the conjugately non-linear saw-tooth control voltage applied to the grid of the tube therefore cause the resultant plate current to be substantially linear. Consequently the current to the deflection coil has the desired wave shape of a substantially linear saw-tooth pattern.

Various other advantageous features are provided in the present system, which may be more readily understood from the following description, as taken in connection with the accompanying drawings, in which Figure 1 is a simple block diagram of a television receiver with a broken line box enclosing the part of the system wherein the present invention is applied;

Figure 1:
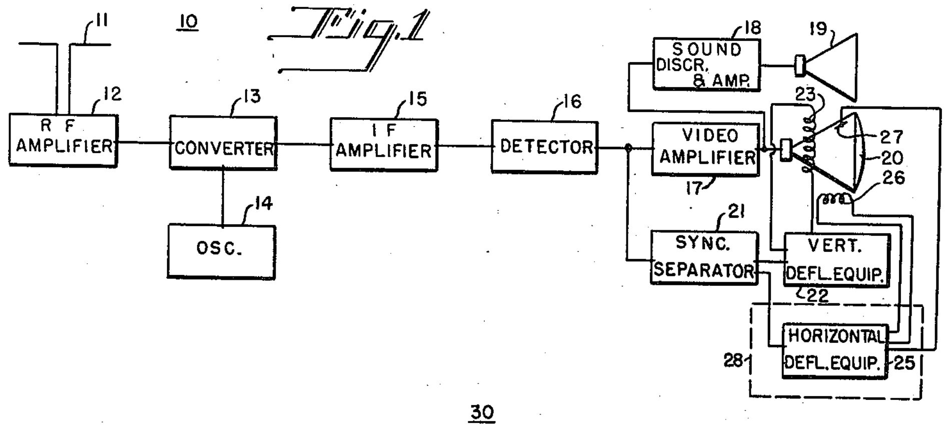

As shown in the block diagram of Fig. 1, a television receiver 10 may be considered, briefly, as comprising a receiving antenna 11, an R.-F. amplifier section 12, a converter 13 controlled by a tuned oscillator 14, an I.-F. amplifier channel 15, a second detector 16, a video amplifier 17, a frequency-discriminator sound detector and amplifier 18, a sound reproducer 19 and a picture-reproducing tube 20, a sync separator 21 for separating the vertical and the horizontal synchronizing signals from the video signal, a vertical deflection equipment 22 for energizing a vertically effective deflection coil 23 on the picture-reproducing tube 20, and a horizontal deflection equipment 25 for energizing a horizontally effective coil 26 and the second anode 27 on the picture-reproducing tube 20.

Figure 2:
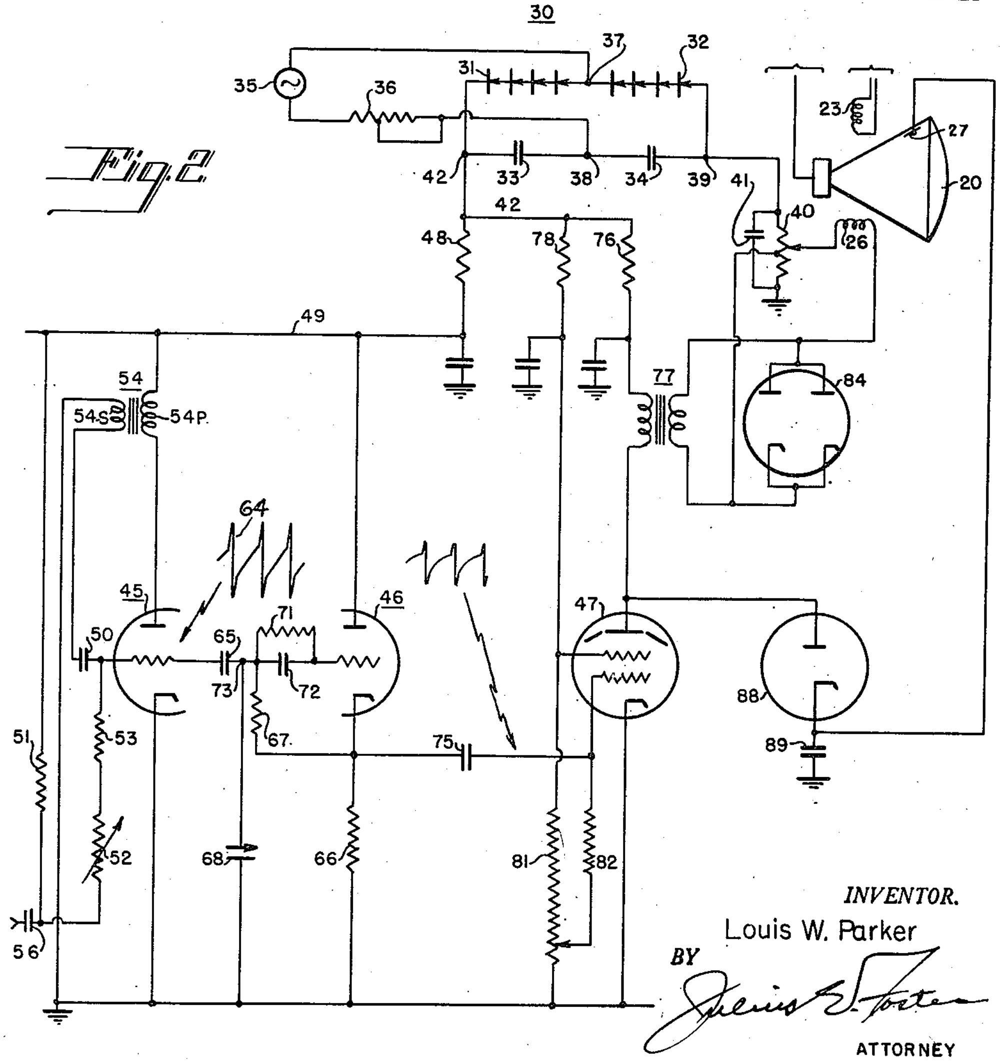
Figure 2 is a diagram of that part of the system wherein the invention resides.

As indicated by the broken-line box 28 around the horizontal deflection equipment 25 for the horizontally effective deflection coil 26, the invention herein is particularly directed to that part of the television receiver, and is illustrated in detail in the diagram of Fig. 2. The circuit as shown in Fig. 2 was applied to control a 7AP4 picture-reproducing tube, with circuit parameters as indicated in the specification.

The conventional transformer power-pack is eliminated in the present system. A source of D. C. voltage is provided by a voltage-doubler 30 comprising two groups or stacks 31 and 32 of selenium rectifiers and two condensers 33 and 34, connected as a bridge. A single-phase alternating-current supply source 35 is connected through an adjustable resistor 36 to two corners 37 and 38 of the bridge, that are the mid-points of the rectifier section and of the condenser section, respectively. The negative terminal of the bridge, at corner 39, is connected through a resistor 40, bridged by a condenser 41, to ground. The other corner 42 of the voltage-doubler constitutes the positive terminal of the voltage-doubler. In an operating circuit that was arranged as shown in Fig. 2, the operating voltage across the terminals of the doubler was 230 volts. This voltage is sufficient for the plate voltages of the tubes as used in the sweep circuit, and thus provides a power supply that may be obtained directly from a single-phase house-lighting line without a step-up transformer.

The function of the horizontal sweep circuit is to provide a current of substantially linear saw-tooth wave shape to the horizontally effective deflecting coil 26 of the picture-reproducing tube, for each line-scanning operation. Since that coil has both resistance and inductance, the voltage that must be applied to the coil must have a pulse-and-saw-tooth wave shape or pattern, in order to drive a current of such saw-tooth wave shape through the coil, as is well understood in the art.

In conventional systems, a first voltage of pulse-and-saw-tooth wave shape is periodically generated in a receiver at regularly spaced time intervals. In that voltage waveshape, the saw-tooth is non-linear. Those time intervals are controlled by the timing of the horizontal synchronizing pulses that are separated out by a synchronizing signal separator such as the separator 21 of Fig. 1 and are then supplied to the horizontal deflection equipment 25. That first pulse-and-saw-tooth voltage is usually then employed to control the development in another circuit of a second pulse-and-saw-tooth voltage wave but with the saw-tooth portion linear in character. That redeveloped voltage is then utilized to drive the power tube to obtain a linear saw-tooth current for the horizontal deflection coil.

In the present system the original or first voltage of pulse-and-saw-tooth waveshape is directly generated with a saw-tooth portion that is linear. The shape of that linear saw-tooth portion is then modified for control purposes to compensate for the non-linear dynamic transfer characteristic of the power tube as employed and operated in this system, so the power tube will be controlled to render its output linear.

As shown in the diagram of Fig. 2, a 12AU7 duplex tube was employed to provide two triode sections 45 and 46, section 45 serving as the operating triode of a blocking oscillator, and section 46 serving as a cathode follower tube. A beam power tube 47, in this case a 6L6, was used to supply energizing current for the deflection coil 26.

Figure 3:
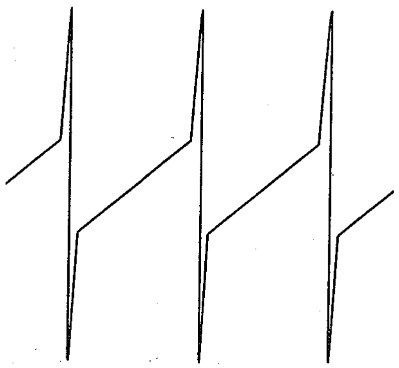
Figure 3 is a graph of the waveform or pattern of the original scanning voltage generated by the present invention.

The left-hand triode section 45 operates with its associated equipment as a blocking oscillator, and serves as the scanning generator to generate a voltage of desired pattern with a pulse-and-saw-tooth wave shape, substantially as shown in Fig. 3. That voltage is developed at the grid by the sync pulse, the resulting transformer pulse, and the charging voltage across a grid condenser 50.

A charging circuit for the condenser 50 (1,000 $\mu\mu$f.) proceeds from the secondary winding 54—*s* of an oscillation transformer 54 through the condenser, the grid and cathode as a diode, to ground and back to the transformer. The discharging circuit for the condenser 50 proceeds from the positive bridge terminal 42 through a filter resistor 48 (1 K) to a plate-voltage bus 49, then through a fixed resistor 51 (150 K), a variable resistor 52 (50 K), a second fixed resistor 53 (10 K), the grid condenser 50, the secondary winding 54—*s* to ground and back to the negative terminal of the voltage doubler 30.

The primary winding of the oscillation transformer 54 is connected in the plate circuit of the oscillator triode section 45, between the plate and the plate-supply bus 49, which is 210 volts above ground. The cathode is connected directly to ground. The horizontal synchronizing pulse from the sync separator 21 is supplied to the grid of triode section 45 through a coupling condenser 56 (50 $\mu\mu$f.) and resistors 52 and 53, and that pulse drives the grid momentarily less negative. The triode becomes more conductive and transmits a current pulse through the transformer primary. The voltage alternation induced in the secondary 54—*s* first further raises the grid potential to a point where the grid becomes highly positive and passes grid current, and then drives the grid potential quickly to a low negative value. While the grid is positive, it provides a low impedance path for the condenser. When the grid is driven negative, the triode impedance becomes effectively infinite, and the condenser negative charge can thereafter discharge slowly according to its circuit constants, including the impedance in its discharging circuit and the potential difference of the effective discharging voltage, which may be taken as the voltage already across the condenser plus the voltage of the plate-supply bus 49, which is 210 volts.

At this point an important feature of this invention may be noted, as distinguished from the present conventional system.

In the conventional system now in use, a duplex 6N7 and a 6BG6 are used in the horizontal sweep circuit. One triode section of the 6N7 is used as a blocking oscillator, and the other triode section is used as the discharge section for a saw-tooth generating condenser. The output of the 6N7 is the control voltage of pulse-and-linear-saw-tooth wave form that is supplied to the control grid of the 6BG6 power tube. The power tube operates in class A. Therefore the plate-supply voltage used in the conventional system must be 300 volts or more. That plate-supply voltage is not utilized to control or aid the discharging of the blocking oscillator condenser, as it is in this system. The condenser of the conventional blocking oscillator merely slowly discharges its own negative charge, which is relatively small, of the order of about minus twenty volts, in accordance with the heavy broken-line curve 60 in Fig. 5. That curve 60 of that voltage, as an exponential, approaches the zero base line level as an asymptote. The usual operating range of the oscillator condenser, as utilized, is only about ten volts, between minus twenty volts and minus ten volts, as represented by line 62, in Fig. 5. The conventional circuit constants are usually such that the synchronizing timing pulse arrives when the condenser voltage rises to about minus ten volts, near but still beyond the cut-off value of the oscillator tube or triode section while the tube or triode is still non-conducting. The timing pulse instantly drives the oscillator condenser and grid more positive to render the triode section conductive for the duration of the pulse. The condenser voltage then immediately drops back again to minus twenty volts, to complete the first operating cycle, as shown by the heavy broken line curve 60, in Fig. 5, dropping to minus twenty volts at the end of one operation.

The curve 60 rises again along the exponential path toward zero base line as the asymptote. The portion of curve 60 between minus twenty volts and minus ten volts is not sufficiently linear to be suitable for a saw-tooth control pattern, and, in the conventional system, is therefore used merely for cut-off bias purposes.

Figures 5, 6:
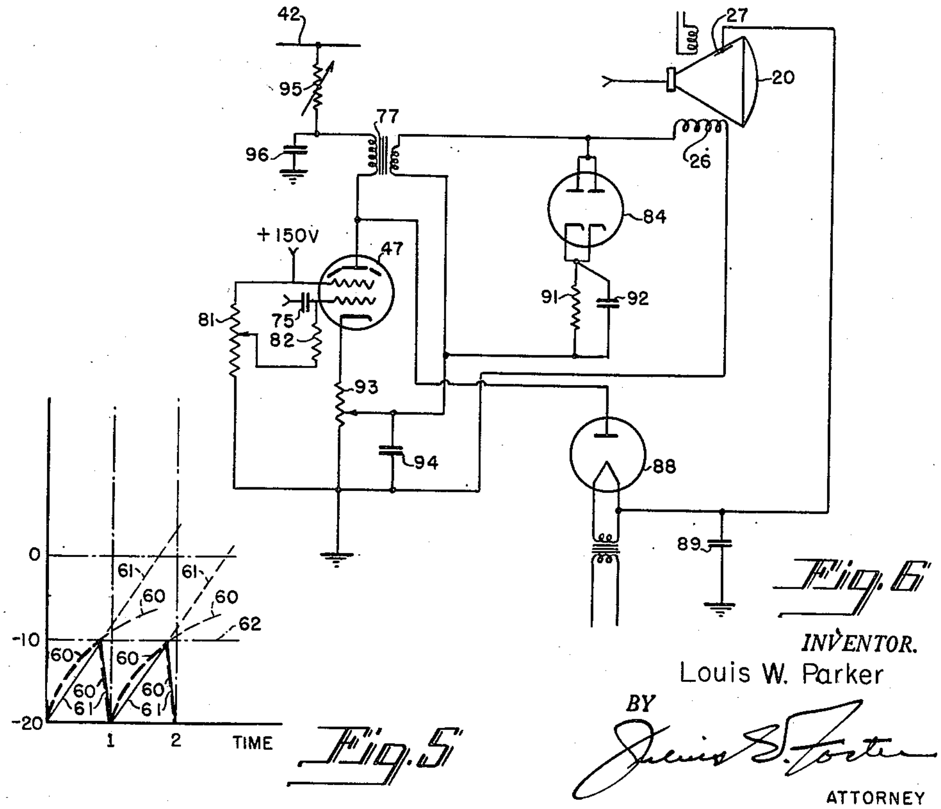
Figure 5 is a graph showing the effect of a high applied voltage on the slope of the charging curve of a condenser.
Figure 6 is a circuit diagram of a modification of the circuit of Fig. 2.

The present system, however, establishes a linear voltage at the grid and condenser 50, in accordance with the straight light solid line 61 in Fig. 5, between the minus twenty and the minus ten volt lines. The curve 61 represents the discharging curve, which rises exponentially toward the 210 volt level of the plate-voltage bus 49. Because the curve 61 rises toward that high level as asymptote, the bottom end of the curve is practically a straight line. The exact effect of the pulse on the curves 60 and 61 near the minus ten volt line is omitted from Fig. 5, since it is desired to show merely the relative curvatures of those two curves in the operating range.

Thus, in the conventional system, the two triode sections of a 6N7 are employed to generate a pulse-and-saw-tooth waveshape in which the saw-tooth is linear, whereas in the system disclosed herein, the one oscillator triode section 45 is made to operate as blocking oscillator and to generate a voltage having a wave-shape that is suitable as a pulse-and-saw-tooth pattern for control purposes.

The saw-tooth portion, as generated herein, provides the linear control pattern desired for the waveshape of the output current from the power tube to energize the horizontal deflection coil of the picture-reproducing tube. For the purpose of this system, that linear portion is then modified to provide the actual control waveshape needed to control the power tube to compensate for the non-linear operating characteristic of the power tube when it is operated in class $AB_2$ in the present system. Thus, in this system, the single left-hand triode section 45 of the duplex tube is made to accomplish the results of both sections of the duplex tube as they are employed in the conventional system; and the right-hand section 46 of the duplex tube is operated herein as a cathode follower to supply grid power to control the power tube 47.

To obtain the desired voltage with the linear saw-tooth pattern in this system, a circuit is provided in which the discharging voltage across the oscillator condenser 50 is the full plate-supply voltage of 210 volts from the plate-supply bus 49 plus the charged voltage on the condenser. That higher voltage across the condenser 50 causes the discharge voltage curve 61 of Fig. 5, which is of interest here, to be practically linear over the small region at the beginning of the curve, where it is utilized for the saw-tooth pattern.

Thus, in this system, the desired saw-tooth pattern is obtained at the oscillator grid, so it is not necessary to use a second triode section for that purpose, as in the conventional system now used. In this system, the voltage across the condenser 50 is utilized to negatively bias its grid at section 45. The pulse from the transformer secondary and the voltage across condenser 50 supply a control voltage to a wave-shaping circuit associated with the triode section 46. The shape of that control voltage is indicated by the wave-form 64 at the grid of section 45, corresponding to the waveform shown in Fig. 3.

The control pattern voltage, from the grid of triode 45 and the condenser 50, is supplied through a coupling condenser 65 (500 $\mu\mu$f.) to the wave-shaping circuit, which includes a cathode resistor 66 (5 K) in the cathode circuit of triode 46, a grid resistor 67 (100 K), and a variable condenser 68 (250$\pm$100 $\mu\mu$f.) connected between ground and the output terminal of condenser 65.

The output from the wave-shaping circuit is supplied through a grid-leak combination to the grid of triode section 46. That grid-leak combination consists of a resistor 71 (0.5 meg.) and a condenser 72 (100 $\mu\mu$f.), and its primary purpose is to supply a bias voltage to triode section 46. Secondarily, it aids the wave-shaping circuit. The pattern voltage from the grid of oscillator 45 is therefore thus modified and reshaped before it is effectively applied to the grid of triode section 46.

The triode section 46 functions as a cathode follower. Its cathode circuit contains the resistor 66 between cathode and ground. The plate supply is 210 volts from the plate-voltage supply bus 49. The conductive coupling back from the cathode to the grid is through the resistor 67, which is part of the wave-shaping circuit.

The output voltage from the cathode-follower section 46 is supplied from its cathode terminal through a coupling condenser 75 (0.1 μf.) to the control grid of the beam power tube 47. The power tube 47 receives its plate voltage from the positive terminal 42 of the voltage-doubler through a filter resistor 76 (85 ohms) and the primary of an output coupling transformer 77 for the deflection coil 26. The cathode of tube 47 is connected directly to ground. The plate-supply voltage as measured at the output of resistor 76 in this circuit was 222 volts. The screen grid is energized from the positive terminal 42 of the voltage-doubler through a filter resistor 78 (4 K) to isolate the screen and bring its energizing voltage down to about 150 volts. A resistor 81 (20 K) ties the screen grid to ground and to the cathode. A grid-leak resistor 82 (20 K) connects the control grid to an adjustably selected point on the screen resistor 81. The power tube 47 thus establishes and obtains self-bias from the rectifying action of its grid and the cathode during its periodic operation when the grid is driven positive, and a charge placed on the coupling and grid blocking condenser 75 by the voltage drop across the resistors 82 and 81.

The connection of grid leak 82 to a point of positive potential as indicated, in this case an adjustable point on dropping resistor 81, makes it possible to employ a grid leak of sufficiently high resistance to prevent an excessively high charge on condenser 75 when tube 47 is operated in class $AB_2$, since the effective voltage across the leak is of course increased by the positive voltage of said leak connection. This is important, since otherwise the charge on condenser 75 might readily be so great that a leak having very low resistance would have to be used, resulting in an excessive load on the driver circuit.

The filter condenser used with the filter resistor 48 was 12 μf.; with resistor 76 the condenser was 40 μf.; and with resistor 78 the condenser was 20 μf.

The output of the power tube 47 is transmitted through its load transformer 77 to the deflection coil 26. A damping tube 84, a double diode which may be of the 5V4 type, is connected directly across the secondary winding of the transformer 77. A D. C. horizontal centering voltage is provided for the deflection coil 26 from a variable tap on the resistor 40 (20 ohms) connected between the negative terminal of the voltage doubler and ground. The condenser 41 (500 μf.) serves as a stabilizing by-pass for the resistor 40. In order to provide a high D. C. voltage for the second anode of the picture-reproducing tube, the induced voltage of the primary of the output transformer 77 is rectified by a diode 88, of the 8016 type, and stored in a load condenser 89 (0.03 μf.) to deliver a voltage of about 3,000 volts to that anode. That voltage is sufficient for a 7AP4 picture-reproducing tube, to which the circuit as described herein was applied.

The operation of the picture-reproducing tube requires a current of substantially linear saw-tooth wave-shape. The saw-tooth part of the pattern voltage that was generated at the condenser 50 and the grid of the oscillator triode section 45 was of such wave-shape, as shown in Fig. 3. That pattern voltage could not be used directly, however, to control the power tube 47, because the power tube is used in class $AB_2$ and its dynamic transfer characteristic is non-linear over its range of use. The control voltage to be supplied to the control grid of the power tube 47 is therefore taken from the pattern voltage and modified by the wave-shaping circuit, in accordance with this invention, so the modified control voltage will be the conjugate of the dynamic transfer characteristic of the power tube. The resultant control effect on the power tube 47 is to establish a substantially linear operation in the tube and to cause the tube to produce a pulse-and-saw-tooth output voltage and a saw-tooth current that are substantially linear, as required. The cathode follower preserves the form of the modified voltage wave-shape and provides the necessary power for the grid circuit of the power tube.

The action of the blocking oscillator section 45 and the condenser 50 generates the pattern voltage, that is generally of the form shown in Fig. 3. That voltage is supplied to the wave-shaping circuit and is there modified to have the form as shown in Fig. 4.

The wave-shaping circuit has a low R-C time constant of the same order of magnitude as the duration of the interval between successive synchronizing pulses. The shaping of the voltage pattern is the primary function of the elements of that circuit. Similarly, the primary function of the associated grid leak for the cathode-follower section 46 is to provide a bias voltage to the grid of that section. However, the grid leak also has a slight effect on the curvature of the saw-tooth portion as modified, and therefore has an auxiliary function in the wave-shaping action. The curvature introduced into the saw-tooth portion of the wave-shape is opposite to that of the dynamic transfer characteristic of the power tube to such extent as to cause the output of the power tube to be linear. By means of the wave-shaping circuit the modified form of the saw-tooth portion in Fig. 4 may be shaped as required to have both proper curvature and amplitude.

A variation of the circuit of Fig. 2 is shown in Fig. 6, where the damping tube 84 is provided with a load consisting of a resistor 91, which may be of a value in the order of 75 ohms, and a by-pass condenser 92 (0.1 μf.). The D. C. centering voltage is obtained from the resistor of a filter combination, consisting of a small resistor 93 (20 ohms) with a variable tap, and a condenser 94 (500 μf.), in the cathode circuit of the power tube 47. The plate circuit in this arrangement receives its voltage through a variable resistor 95 (500 250 ohms) of a filter including a condenser 96 (40 μf.), and the primary of the transformer 77. Otherwise, the other parts of the circuit are as shown in Fig. 2. In this arrangement of Fig. 6 the resistor 95 serves to limit the swing on the seven inch tube that was used.

Figure 4:
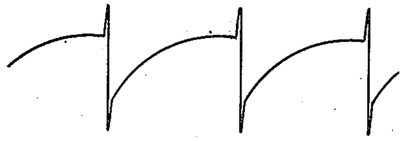
Figure 4 is a graph showing the modified or conjugate wave form derived from that of Fig. 3 for proper control of the power tube.

In the adjustment of the wave-shaping circuit to vary the amplitude of the modified saw-tooth portion to the form shown in Fig. 4, the coupling condenser 65 and the adjustable condenser 68 act as a voltage divider, so adjustment of the variable condenser 68 may be utilized to establish the proper parameter for the desired amplitude of the saw-tooth. The effect on the pulse portions is not material since in the negative direction they go past plate current cut-off, and in the positive direction they are clipped by the diode action of the power tube grid. The slight excursion beyond the upper operating point introduces a slight time delay of about one microsecond in initiating the return of the electron beam in the picture-reproducing tube, but that delay can be compensated by delaying the video signal correspondingly in the circuit ahead of the picture-reproducing tube.

In practice it was not necessary to delay the video signal ahead of the picture-reproducing tube. The return time of the horizontal sweep is sufficiently short so that even with the slight delay in initiating the return sweep, as introduced in this system, the return sweep is completed before the end of the horizontal blanking period.

In this specification one specific circuit has been described in detail, operating in accordance with the invention. The several operating potentials and other values have been indicated. The oscillograms of the wave shapes have also been shown in Fig. 3 and Fig. 4. Such detailed explanation has been provided to facilitate the full and complete understanding of the principles of the invention. Moreover, the specific circuit parameters have been indicated for a specific size of picture-reproducing tube.

Obviously, the circuit might be modified and the parameters and other values changed as might be necessary for picture-reproducing tubes of different size, or for other conditions, without departing from the spirit and scope of the invention as described herein and as set forth in the appended claims.

I claim:

1. A power-transformerless television receiver comprising a picture-reproducing tube having a coil for electro-magnetically deflecting the cathode ray beam of the tube in a horizontal direction, a circuit including an electron discharge tube supplying a current of saw-tooth waveshape to the deflecting coil, and a control circuit for the electron discharge tube arranged to operate it in class $AB_2$, said control circuit including a power tube, a generator of a saw-tooth shaped voltage, and a cathode-follower tube circuit responsive to said saw-tooth voltage and having an output supplying signal energy to the power tube.

2. A power-transformerless television receiver comprising a picture-reproducing tube having a coil for electro-magnetically deflecting the cathode ray beam of the tube in a horizontal direction, a circuit including an electron discharge tube supplying a current of saw-tooth waveshape to the deflecting coil, said tube having an anode and a control grid, a source of plate voltage for said anode, said source comprising a voltage-doubler adapted to be energized directly by an alternating current circuit of house-lighting voltage, and a control circuit arranged to control the grid voltage to operate the tube in class $AB_2$ including compensating circuit means located between said sawtooth wave supply tube and an end of the deflecting coil, arranged to compensate for variations in the slope of the transfer characteristic of the discharge tube, to establish an effectively linear output from the electron discharge tube, whereby a relatively large plate voltage and plate current swing may be obtained from the relatively low voltage plate supply.

3. An electron control circuit comprising a generator for generating a voltage of pulse-and-substantially-linear-saw-tooth waveform, a circuit including an electron discharge tube controlled to supply a current of pulse-and-substantially-linear-saw-tooth wave form, said tube having a non-linear transfer characteristic over the range of operation in class $AB_2$, and compensating circuit means located in the output of the sawtooth generator and responsive to the voltage from said voltage generator arranged for modifying the wave form of the linear saw-tooth portion of the wave form and then supplying the voltage of such modified wave form to the electron discharge tube circuit to compensate for the non-linearity of the slope of the transfer characteristic, and thereby to cause the saw-tooth portion of the output of that tube to be substantially linear relative to the saw-tooth portion of the generated voltage.

4. A power-transformerless television receiver comprising a picture-reproducing tube having a coil for electro-magnetically deflecting the cathode ray beam of the tube in the horizontal direction, and a sweep circuit for controlling the energization of the deflecting coil, said sweep circuit comprising a blocking oscillator triode, means to supply a synchronizing control pulse to its grid, a condenser and a blocking oscillator transformer connected to the grid and functioning to generate a pulse-and-sawtooth shaped voltage wave, a high current output electron tube connected to supply an energizing current for the deflecting coil, and means including a cathode-follower tube connected between said condenser and the control grid of the high-current tube to supply signal energy to said control grid in accordance with the voltage of said pulse-and-saw-tooth wave.

5. A receiver as in claim 4, in which the sweep-circuit control pulse supplying means comprises a blocking oscillator tube circuit arranged to be controlled by a synchronizing pulse, and a cathode follower tube circuit controlled from the blocking oscillator tube circuit and connected to control the operation of the high-current tube.

6. A sweep circuit capable of operating from low plate supply voltage for the horizontal magnetic deflecting coil of a picture-reproducing tube, comprising an electron discharge output tube, an electronic generator of a voltage having a pulse-and-saw-tooth shape, said generator including a tube having a control electrode connected to be energized periodically by a synchronizing pulse, a circuit including a cathode-follower tube circuit for energizing the output tube in accordance with the generated pulse-and-saw-tooth voltage, a transformer coupling between the output tube and the deflecting coil, and a low-voltage plate supply for the output tube, said plate supply comprising a voltage-doubler arranged to be energized directly without a transformer from a single-phase supply line of usual house-lighting voltage.

7. In a television receiver, in which a picture-reproducing tube is employed that utilizes a coil for horizontal electro-magnetic deflection of the cathode ray beam in the picture-reproducing tube and in which a blocking oscillator is employed that includes (1) a vacuum tube with a grid that is periodically energized by a synchronizing pulse, (2) a blocking oscillator transformer, and (3) a condenser connected to the grid, with the condenser energized from the blocking oscillator transformer and from a plate-supply voltage to cause a voltage of pulse-and-saw-tooth shape to be generated at the grid, and in which a high-current-capacity vacuum tube is to be controlled to supply energizing current in accordance with said pulse-and-saw-tooth voltage to the deflection coil, the method of controlling the high-current tube to cause it to supply a current wave of such saw-tooth shape to the deflection coil, said method comprising operating the high-current tube to develop its own negative bias by grid rectification of the periodic pulses to the grid with its cathode substantially at the potential of the negative terminal of the plate supply voltage, so the plate voltage is substantially entirely available in the plate circuit, and in supplying a control signal voltage to the grid of the high-current tube in accordance with a function of the pulse-and-saw-tooth voltage generated at the blocking oscillator.

8. The method of operating a television receiver as in claim 7, which includes the step of supplying the signal control voltage to the grid of the high-current tube at sufficient amplitude to cause that tube to operate in class $AB_2$ to thereby reduce the impedance of that tube substantially and to make a very substantial part of the plate voltage of that tube available to supply energy to the deflection coil.

9. The method of operating a television receiver as in claim 8, including the additional step of modifying the amplitude and linearity of the saw-tooth portion of the voltage wave supplied to the high-current tube to compensate for the variation in slope of the transfer characteristic of that tube and to thereby effect a linear output from that tube to the deflection coil.

10. A power-transformerless television receiver comprising a picture-reproducing tube having a coil for electro-magnetically deflecting the cathode ray beam of the tube horizontally, a power tube for supplying energy to the deflecting coil, a relaxation oscillator including an electron tube with a grid, the repetition rate of the oscillator being adapted to be controlled by an external synchronizing pulse to cause a pulse-and-saw-tooth voltage to be generated at the grid of the tube, and a control circuit responsive to the voltage at the oscillator grid and connected to energize the grid of the power tube.

11. A television receiver as in claim 10, in which the control circuit from the oscillator grid condenser includes a condenser-resistor circuit to modify the shape of the saw-tooth portion of the wave from that grid condenser and then to supply the wave of such modified shape to the control grid of the power tube.

12. A television receiver as in claim 11, in which a cathode-follower is connected between the condenser-resistor wave-shape-modifying circuit and the control grid of the power tube.

13. A power transformerless television receiver comprising a picture-reproducing tube having a horizontal deflection coil, a horizontal sweep circuit including a power tube having an output circuit operatively connected to said coil, and a control grid; a sawtooth generator operatively connected to said control grid, and a grid control circuit connected to said grid and arranged to operate the tube in class $AB_2$, including a grid condenser and a grid leak connected at its discharge end to a source of positive potential.

14. In a television receiver comprising a picture-reproducing tube with a horizontally effective magnetic deflecting coil, and a circuit including an electron discharge power tube of the beam type for supplying a current of saw-tooth wave shape to the deflecting coil, the method of operating the tube from a low-voltage plate supply source in order to dispense with the usual power transformer heretofore used for supplying an adequate plate voltage, which method comprises operating the power tube in class $AB_2$ with its cathode substantially at the potential of the negative terminal of the plate supply voltage and controlling the beam tube operation to produce a linear output.

15. In a television receiver as in claim 14, the method therein set forth, including imposing a positive charging voltage on a control grid condenser and an operating self-rectifying negative bias on that grid, to establish a limited positive-going saw-tooth control voltage on the grid.

16. A method as claimed in claim 15 including the method of preventing an excessive load on the tube which comprises producing the negative bias through a grid leak, providing a positive voltage at the discharge end of said leak which permits the use of a leak having sufficient resistance to prevent an excessive charge on said condenser.

17. A television receiver comprising a picture-reproducing tube employing magnetic deflection of the cathode ray beam for scanning action, a coil for effecting horizontal deflection of the beam, means for generating a control signal voltage having a partial linear characteristic providing a pattern for the current to be supplied to the coil, an electron discharge tube acting as a non-linear device with a non-linear dynamic transfer characteristic connected to supply energizing current to the coil, and means responsive to the pattern signal voltage for developing a voltage of modified pattern shape to compensate for the deviation of the dynamic transfer characteristic from linearity and for supplying such modified pattern voltage to the control grid of the tube to cause the output plate current from the tube to the coil to have a wave form corresponding substantially to the first-mentioned linear pattern.

18. A television receiver comprising a picture-reproducing tube employing magnetic deflection of the cathode ray beam for scanning action, a coil for effecting horizontal deflection of the beam, means for generating a control signal voltage having a partial linear characteristic providing a pattern for the current to be supplied to the coil, an electron discharge tube acting as a non-linear device with a non-linear dynamic transfer characteristic connected to supply energizing current to the coil, and means responsive to the pattern signal voltage and acting upon a circuit of the electron discharge tube to compensate for the deviation of the dynamic transfer characteristic from linearity and thereby to cause the current from the tube to the coil to have a wave form corresponding substantially to the first mentioned linear pattern.

LOUIS W. PARKER.

REFERENCES CITED

The following references are of record in the file of this patent:

UNITED STATES PATENTS

| Number | Name | Date |
|---|---|---|
| 2,074,495 | Vance | Mar. 23, 1937 |
| 2,153,140 | Diehl et al. | Apr. 4, 1939 |
| 2,179,607 | Bedford | Nov. 14, 1939 |
| 2,212,217 | White et al. | Aug. 20, 1940 |
| 2,217,831 | Ballard | Oct. 15, 1940 |
| 2,230,819 | White | Feb. 4, 1941 |
| 2,246,918 | Iams | June 24, 1941 |
| 2,248,975 | Faudell | July 15, 1941 |
| 2,358,297 | Bedford | Sept. 19, 1944 |
| 2,358,545 | Wendt | Sept. 19, 1944 |
| 2,383,822 | Schlesinger | Aug. 28, 1945 |
| 2,440,786 | Schade | May 4, 1948 |
| 2,440,895 | Cawein | May 4, 1948 |
| 2,482,737 | Shaw | Sept. 20, 1949 |